United States Patent
Andrade et al.

(10) Patent No.: US 9,572,322 B2
(45) Date of Patent: Feb. 21, 2017

(54) CHEESE CONTAINER, CHEESE BLOCK AND METHOD OF BRANDING CHEESE

(75) Inventors: Raul Andrade, La Habra Heights, CA (US); William J. Finicle, Anaheim Hills, CA (US)

(73) Assignee: LOS ALTOS FOOD PRODUCTS, INC., City of Industry, CA (US)

( * ) Notice: Subject to any disclaimer, the term of this patent is extended or adjusted under 35 U.S.C. 154(b) by 3437 days.

(21) Appl. No.: 10/956,600

(22) Filed: Oct. 1, 2004

(65) Prior Publication Data

US 2006/0086260 A1 Apr. 27, 2006

(51) Int. Cl.
*A01J 25/12* (2006.01)
*A01J 25/13* (2006.01)
*A23C 19/06* (2006.01)

(52) U.S. Cl.
CPC ............. *A01J 25/12* (2013.01); *A01J 25/13* (2013.01); *A23C 19/06* (2013.01)

(58) Field of Classification Search
CPC ............ A01J 25/12; A01J 25/13; A23C 19/06
USPC ........ 426/130, 123; D7/43; 99/456; D1/115, D1/130
See application file for complete search history.

(56) References Cited

U.S. PATENT DOCUMENTS

| | | | | |
|---|---|---|---|---|
| 321,857 A | * | 7/1885 | Schuette | 425/410 |
| 707,528 A | * | 8/1902 | Wolfinger | 249/52 |
| 943,093 A | * | 12/1909 | Mueller | 249/52 |
| 1,418,242 A | * | 5/1922 | Fieldman | 100/116 |
| 1,914,035 A | * | 6/1933 | Moeschlin | 101/36 |
| 1,915,487 A | * | 6/1933 | Gere | 220/203.17 |
| D165,391 S | * | 12/1951 | Peters | D1/115 |
| D165,931 S | * | 2/1952 | Peters | D1/115 |
| D165,932 S | * | 2/1952 | Peters | D1/115 |
| D167,536 S | * | 8/1952 | Peters | D1/115 |
| D167,583 S | * | 8/1952 | Peters | D1/115 |
| D167,847 S | * | 9/1952 | Peters | D1/115 |
| 2,631,939 A | * | 3/1953 | Peters | 426/104 |
| D173,587 S | * | 11/1954 | Peters | D1/115 |
| 2,726,517 A | * | 12/1955 | Pruett | 249/52 |
| 2,745,752 A | * | 5/1956 | Peters | 426/119 |
| 2,770,547 A | * | 11/1956 | Peters | 426/87 |
| 3,976,796 A | * | 8/1976 | Peters | 426/115 |
| 4,437,787 A | | 3/1984 | van der Ploeg et al. | |
| 5,065,671 A | | 11/1991 | Tameris | |

(Continued)

FOREIGN PATENT DOCUMENTS

FR 2 782 982 * 3/2000 ............ B65D 43/06

OTHER PUBLICATIONS

Trademark Electroinc Search System (TESS), Los Altos, work mark and design, Dec. 1989, (retrieved from the internet) Retrieved from URL: <http://tess2.uspto.gov/bin/showfield?f=doc &state=4008:2s58fr.2.12>. Retrieved on Jan. 2, 2010.*

(Continued)

*Primary Examiner* — Erik Kashnikow
*Assistant Examiner* — C Smith
(74) *Attorney, Agent, or Firm* — John J. Connors; Connors & AssocSpc

(57) ABSTRACT

A container is disclosed that is used to from a block of cheese having a brand marking. The container has dividers located on an internal side of a sidewall of the container. The block of cheese may be divided into slices of cheese where a slice of cheese has a brand marking.

5 Claims, 8 Drawing Sheets

(56) References Cited

U.S. PATENT DOCUMENTS

D350,632 S * 9/1994 Cummins .................. D32/53
5,626,251 A    5/1997 Luburic et al.
D396,335 S * 7/1998 Bonnard .................. D1/115

OTHER PUBLICATIONS

Queso Manchego, Exterior markings, [on line], Jun. 17, 2004, retrieved Nov. 5, 2012. Retrieved from the Internet: URL:<http://en.wikipedia.org/wiki/File:Manchego.jpg>.*

The Cheesemonger's Table, Manchego Cheese, Exterior markings, [on line], retrieved Nov. 5, 2012. Retrieved from the Internet: URL:<http://cheesemongerstable.com/cheeses-by-region/spain/manchego/>.*

SaveurEspangnole.com, The Manchego Cheese [on line], retrieved on Nov. 5, 2012. Retrieved from the Internet: URL:<http://www.saveurespagnole.com/blog_entrada.php?id=19&tit=The-Manchego-Cheese>.*

Torres, P.C., Manchego Cheese, Denomination of Orgin Regulating Council, CRDO Queso Manchego, Lozanok A.G., Ciudad Real, Spain.*

Queso Manchego, Regulations of the origin denomination, [on line] Mar. 2003, retrieved Nov. 29, 2012. Retrieved from the Internet: URL:<http://www.quesosdelahuz.com/en/emapaw_qman3.html>.*

Cheese from Spain Manchego, "The Cheese of Don Quixote" [on line] Jan. 31, 2001, retrieved Nov. 27, 2012. Retrieved from the Internet: URL<www.cheesefromspain.com/CFS/1505Manchego_1.htm>.*

Manchego Cheese, [on line] Aug. 16, 2003, retrieved Nov. 17, 2012. Retrieved from the Internet: URL<http://www.spain.info/en/saborea/productos/queso_manchego.html>.*

Queso Manchego Reglamento del Consejo Regulador de la Denominacion de Origen (and partial translation), [on line] Jan. 31, 2001, retrieved on Nov. 30, 2012. Retrieved from the Internet: URL<http://www.cerespain.com/reglamento-queso-manchego.html>.*

* cited by examiner

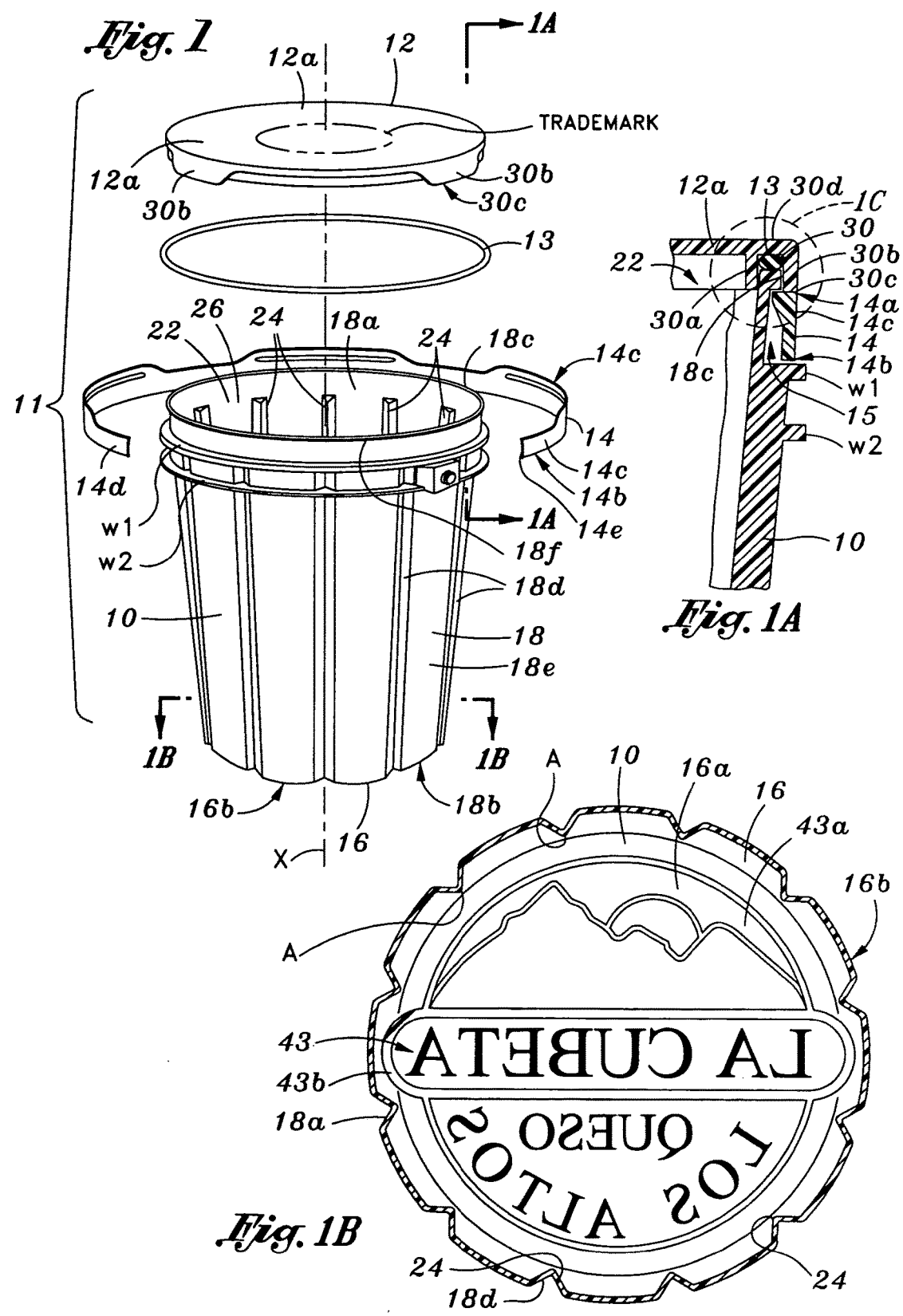

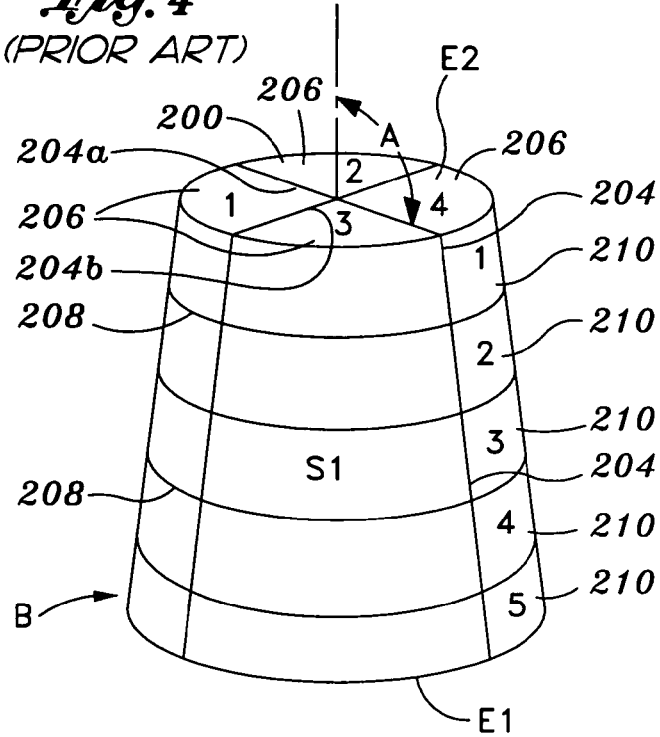
Fig. 4
(PRIOR ART)
Fig. 4A
(PRIOR ART)
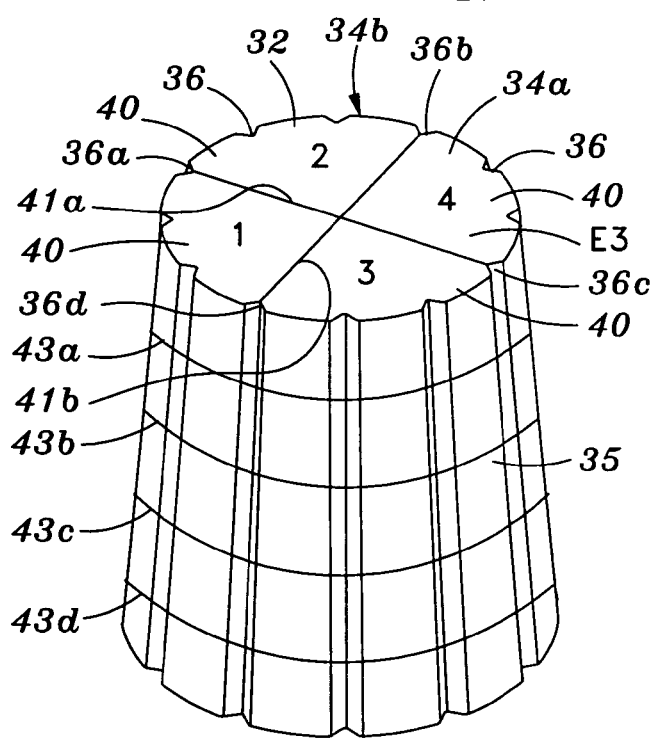
Fig. 5
Fig. 5A

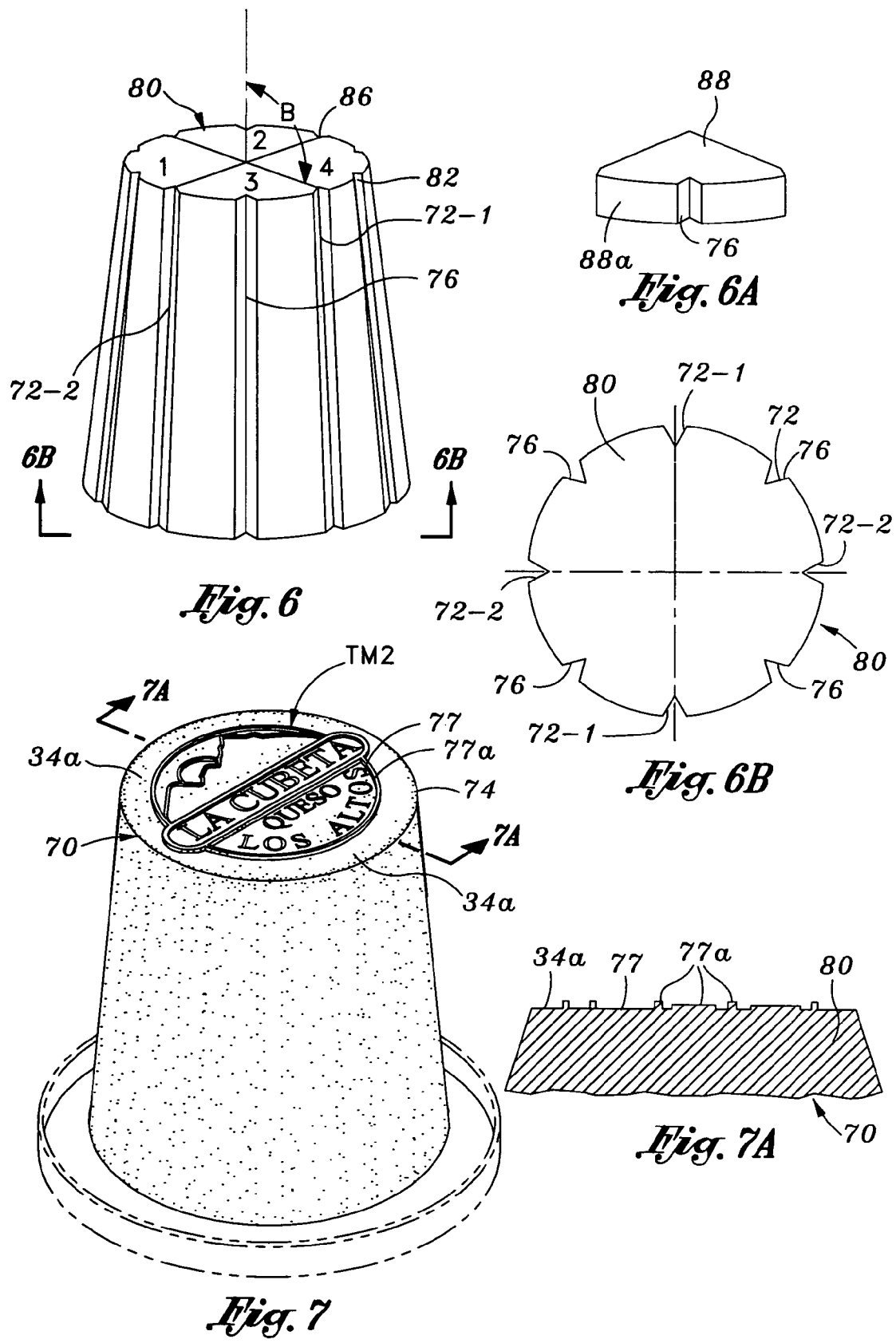

CHEESE CONTAINER, CHEESE BLOCK AND METHOD OF BRANDING CHEESE

INCORPORATION BY REFERENCE

Applicants incorporate herein by reference any and all U.S. patents, U.S. patent applications, and other documents, hard copy or electronic, cited or referred to in this application.

BACKGROUND OF INVENTION

A block of cheese is typically formed by depositing malleable cheese into a container, such as a truncated, conically shaped bucket. The malleable cheese may be heated above normal room temperature to a liquid or paste-like state, and in this state, deposited in the container. The heated cheese is allowed to cool and harden into a block of cheese that has a shape that conforms to the interior of the container. The block of cheese is then removed from the container and sliced into smaller pieces that are sold either packaged or unpackaged. Examples of cheese molds are disclosed in U.S. Pat. No. 4,437,787 and U.S. Pat. No. 5,065,671 and an example of a container lid that may be used with cheese containers is disclosed in U.S. Pat. No. 5,626,251.

SUMMARY OF INVENTION

This invention has one or more features as discussed subsequently herein. After reading the following section entitled "DETAILED DESCRIPTION OF SOME EMBODIMENTS OF THIS INVENTION," one will understand how the features of this invention provide its benefits. The benefits of this invention include, but are not limited to: (1) a low cost, convenient way to brand cheese blocks and cheese slices, (2) branded cheese blocks made concurrent with the manufacture of the cheese block during molding, (3) branded, approximately one pound cheese formed during cutting of a block of cheese in a conventional manner. Without limiting the scope of this invention as expressed by the claims that follow, some, but not necessarily all, of its features are:

One feature of this invention is a cheese block having an external side including at least one longitudinal marking formed during the molding of the cheese block. The cheese block may be substantially in the form of a truncated cone. In one embodiment of this invention, the cheese block has a display end bearing a brand marking formed during the molding of the cheese block and a base end opposite the display end that is adapted to be placed on a flat support surface. In another embodiment of this invention, a cheese block is provided that includes at least one longitudinal marking formed during the molding of the cheese block in the side of the block and a display end bearing a brand marking formed during the molding of the cheese block. In one embodiment, the cheese block weighs substantially 20 pounds and is cut into quarters and the quarters cut into five stacked sections to form twenty cheese slices each weighing substantially one pound. The cheese block may be substantially in the form of a truncated cone.

Two, this invention also includes bucket used during the process of molding a cheese block of this invention. The bucket includes a floor and a sidewall extending from the floor and terminating in an outer edge defining an open mouth. The sidewall forms within the bucket an internal cavity having an interior surface with at least one longitudinal divider member thereon. This divider member serves a branding element. In one embodiment of this invention, the divider member is an inwardly projecting rib, and in another embodiment the divider member is a groove in the sidewall having an inwardly facing, open entryway. The sidewall may taper outward from the floor, and the internal cavity maybe configured as a truncated cone. In one embodiment of the bucket of this invention there are twelve equally spaced apart, divider members that may be substantially parallel. The bucket may have a volume of substantially 2.2 gallons. In an embodiment of the bucket of this invention, the bucket has a floor with a branding element thereon that forms a brand marking on a bottom of the block of cheese and does not include any divider members on the bucket's sidewall.

Three, this invention also includes a container holding a block of cheese therein. It includes a bucket as discussed above and a removable lid sealing the bucket's open mouth. In one embodiment of the invention, the bucket's sidewall may have a plurality of longitudinal divider members thereon. The block of cheese fills substantially completely the bucket's internal cavity with an external side surface portion of the block in contact with the divider members. The divider members form longitudinal brand markings on the external side surface portion of the cheese block. In another embodiment, the bucket's floor includes a branding element and there are no divider members on the bucket's sidewall. In still another embodiment, the bucket has branding elements both on its floor and sidewall.

Four, this invention also includes a method of branding a cheese block or cheese slice, or both. In one embodiment, the method comprises:

(a) depositing cheese in the type of bucket discussed above bucket to form within the bucket a block of cheese, and (b) removing the block of cheese from the bucket; the block, upon removal from the bucket, having on an exterior surface either a longitudinal brand marking on its side or on its top surface or both, formed by branding elements within the bucket.

After removal from the bucket, the brand marking formed on the surfaces of the cheese block are visible. The cheese block may be cut into a plurality of individual slices. If the divider members are on a sidewall of the bucket, longitudinal brand markings are formed on a side of the cheese block. Each slice may have thereon a segment of at least one of these marking. If only a branding element on the bucket's floor is used, only the top surface of the cheese block will bear a brand marking.

DESCRIPTION OF DRAWINGS

Some embodiments of this invention, illustrating all its features, will now be discussed in detail. These embodiments depict the novel and non-obvious cheese container, cheese block, and branding method of this invention as shown in the accompanying drawing, which is for illustrative purposes only. This drawing includes the following figures (Figs.), with like numerals indicating like parts:

FIG. 1 is an exploded, perspective view of one embodiment of the container of this invention.

FIG. 1A is fragmentary, cross-sectional view taken along line 1A-1A in FIG. 1 with the container's lid attached and sealed.

FIG. 1B is a cross-sectional view taken along line 1B-1B in FIG. 1.

FIG. 4 is perspective view of a prior art block of cheese.

FIG. 4A is a perspective view of a prior art slice of cheese cut from the block of cheese shown in FIG. 4.

FIG. 5 is a perspective view of a block of cheese formed from a container similar to that shown in FIG. 1 except there is no brand marking used on the bottom of the container forming this cheese block.

FIG. 5A is perspective view of a slice of cheese taken from the block of cheese shown in FIG. 5.

FIG. 6 is a perspective view of another embodiment of a block of cheese according to this invention having eight (8) substantially V-shaped, longitudinal grooves in the side of the cheese block and no brand marking used on the bottom of the container forming this cheese block.

FIG. 6A is perspective view of a slice of cheese taken from the block of cheese shown in FIG. 6.

FIG. 6B is a bottom view of the cheese block shown in FIG. 6 taken along line 6B-6B of FIG. 6.

FIG. 7 is a perspective view of another embodiment of a block of cheese according to this invention having a single brand marking of its top surface and no brand markings on its side.

FIG. 7A is a cross-sectional view taken along line 7A-7A of FIG. 7.

PRIOR ART

Figure 1C:
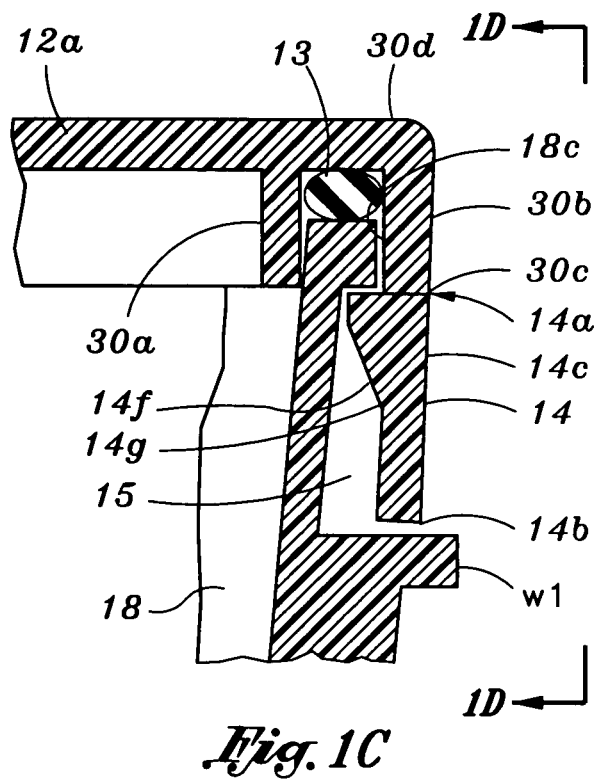
FIG. 1C is an enlarged fragmentary view taken along line 1C in FIG. 1A.

As depicted in FIGS. 4 and 4A, one method of merchandising cheese is to sell at wholesale to delicatessens, or other retailers, a cheese block 200 weighing about 20 pounds, which the retailer cuts into twenty (20) slices 202 (only one shown) weighing about 1 pound each. Typically, two or three cheese blocks 200 of the same brand are displayed in a row, from front to back of a display case (not shown), usually with a glass front and open back. If any brand identification is used, it comprises sign placed in close proximity to the cheese block 200 to identify the source of the cheese block. The cheese block 200 and the individual slices 202 do not carry any brand identification or marking, that is, a trademark.

The cheese block 200 comes in a sealed bucket (not shown) with smooth internal surfaces so the exterior of the cheese block 200 has a smooth external surface S1. The retailer removes the cheese block 200 from the bucket by detaching its lid (not shown) and inverting the bucket so the cheese block slides from the open mouth (not shown) of the bucket. The cheese block 200 is stood on its large flat end E1 that is adjacent the mouth of the bucket when the block is contained within the bucket. The top end E2 of the cheese block 200, which abuts the inside bottom of the bucket when the block is contained within the bucket, is now exposed to view.

The cheese block 200 is usually cut longitudinally along planes 204a and 204b that intersect at right angles, severing it into four equally sized quarter blocks 206. The quarter blocks 206 may then be cut along four (4) parallel latitudinal planes 208, severing each of the quarter blocks 206 into five substantially equally thick sections 210. This creates twenty (20) individual, wedge-shaped slices 202 of cheese. As cheese slices 202 are sold, the slices are typically taken from the rear of the cheese block 200. When one entire cheese block 200 is sold, a new cheese block is now placed in the front of the display case. After cutting the cheese block 200, one or more individual slices 202 may be removed from the severed block and placed in the display case adjacent the cheese block.

Detailed Description of Some Embodiments of this Invention

Figure 1D:
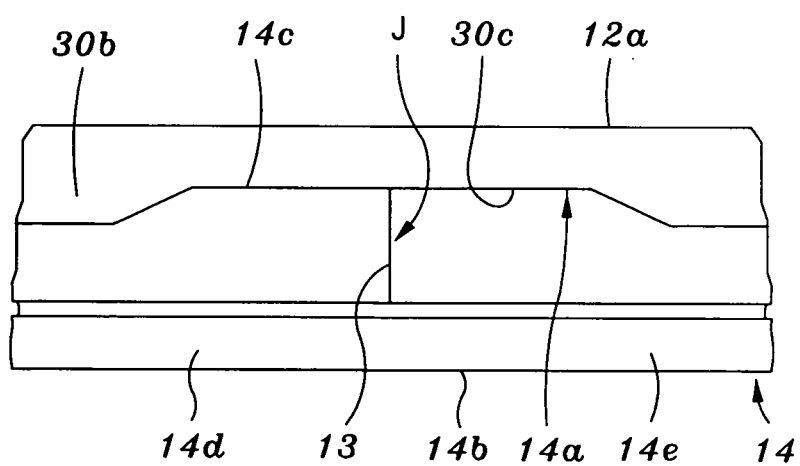
FIG. 1D is an enlarged fragmentary view of a tear strip prior to being removed from the lid of the container of this invention shown in FIG. 1.
Figure 2:
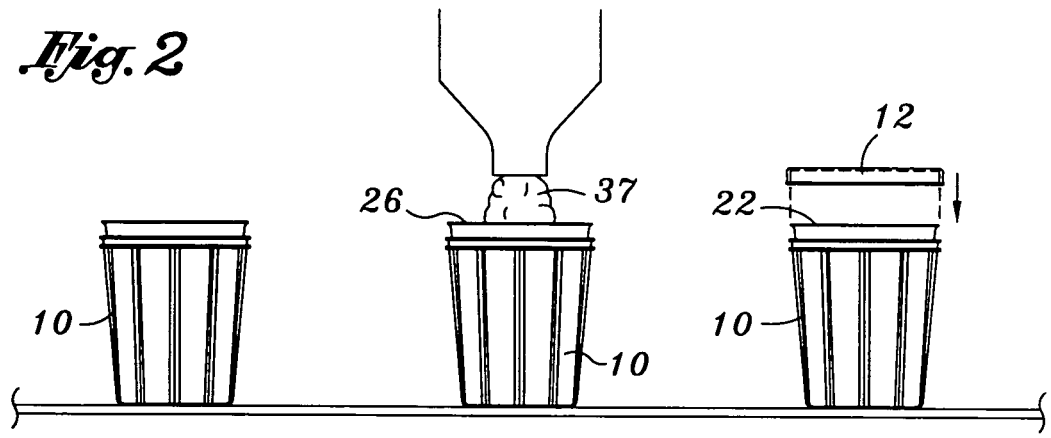
FIG. 2 is a diagram illustrating a process for depositing cheese within the container shown in FIG. 1.

As shown in FIG. 2, a cheese block 34 (FIG. 3) according to one embodiment of this invention is formed and branded by first depositing malleable cheese 37 into a bucket 10 (FIGS. 1, 1A and 1B) made according to this invention. The bucket 10 is used as a mold to form the cheese block 34, which upon subsequent removal from the bucket 10 may be displayed for sale by a retailer. The malleable cheese 37 may be heated such that it is substantially in liquid or paste form and may be poured into the bucket 10. Upon being deposited in the bucket, the malleable cheese 37 substantially fills an internal cavity 26 of the bucket 10. The malleable cheese 37 is allowed to cool and harden within the bucket 10 into the block 34. As depicted best in FIGS. 1, 1A and 1C, a lid 12 may then be placed onto an open mouth 22 of the bucket 10 to provide a sealed container 11 with the cheese block 34 contained therein.

As discussed subsequently in greater detail, a cheese block made in accordance with this invention bears a brand marking on its top surface or its side or both. For example, a top end E3 of the cheese block 34 is marked with a trademark TM1 during the formation of the block by a branding element 43 on an internal surface of a floor 16 of the bucket 10. This cheese block 34 also has a brand marking on its side in the form of grooves 36. In contrast, the cheese block 70 (FIG. 7) does not have any brand markings on its side. The cheese blocks 70 (FIG. 7), 80 (FIG. 6), and 100 (FIG. 8) are made in essentially the same manner as the cheese clock 34 but employ slightly different brand markings. The cheese blocks 34 and 100 have the identical trademarks TM1 on their top surfaces but different brand marking on their respective sides. The cheese block 70 has a trademark TM2 that is similar to the trademark TM1 but is made using a different type of branding element than that used to make the trademarks TM1 so the trademark TM2 projects outward from its top surface as contrasted to the trademark TM1 which is an indentation in its block's top surface. As illustrated in FIG. 5, the cheese block 34b is also made in the manner illustrated in FIG. 2 and is essentially the same as the cheese block 34 except it does not have any trademark on its exposed top end E3, but has brand markings on its side that are formed during manufacture.

FIGS. 1, 1A, 1B, and 1C depict one embodiment of the sealed cheese container of this invention, namely, the cheese container 11. The container 11 comprises the bucket 10 and the lid 12 including a tear strip 14 integral with the lid and formed along with the lid during its manufacture. This tear strip 14 is manually removed to open the sealed container 11. Prior to placing the lid 12 on the bucket 10, the bucket is filled with malleable cheese 37 as discussed in connection with FIG. 2. After filling the bucket 10 with the malleable cheese 37, the lid 12 is forced onto the bucket 10 with an O-ring 13 seated on the bucket's outer edge 18c defining an open mouth 22, sealing the container 11. The bucket 10 and lid 12 may each be made from plastic using a conventional injection molding process. A bucket and a lid made in this manner will each be a unitary, integral structure.

The bucket 10 has a floor 16 and a sidewall 18 tapering outward from the floor and terminating in the outer edge 18c. The sidewall 18 has an inner side 18a and an outer side 18e. The floor 16 has an interior side 16a and a base side 16b and may be substantially flat and at a right angle to the longitudinal axis X of the bucket 10. The sidewall 18 extends from the interior side 16a of the floor 16 from a bottom end 18b of the bucket to the outer edge 18c. In this embodiment, the interior side 16a of the floor 16 is substantially planar and has circular shaped perimeter. This floor 16 may, however, have alternate shapes such as, for example, concave or convex. Along the outer side 18e are a pair of spaced apart ring-shaped, reinforcing walls W1 and W2 that are substantially at a right angle to the bucket's longitudinal axis X and slightly below the open mouth 22. A lip 18f at the open mouth 22 just above the wall W1 is adjacent to an indented section IS in the sidewall 18.

In one embodiment, the outer side 18e of the sidewall 18 tapers outward at an angle greater than 90° from a bottom end 18b of the bucket 10 to the outer edge 18c. Thus, the floor 16 and the sidewall 18 form a structure configured as a truncated cone that establishes the volumetric capacity of the internal cavity 26. In one embodiment, this volumetric capacity is about 2.2 gallons. In an alternate embodiment, the sidewall 18 may taper outward at an angle less than 150° from the bottom end 18b to the outer edge 18c. The sidewall 18 may also be at different angles with respect to the floor 16 along different portions along the length of the sidewall. For example, it may taper outward from the bottom end 18b to a point along the length of the sidewall, typically about midway, then taper inward towards the outer edge 18c until an upper portion (not shown) of sidewall 18 is substantially perpendicular to the floor 16.

As best shown in FIGS. 1A and 1C, the lid 12 and tear strip 14 are attached initially but in a manner that enables the tear strip to be manually disconnected from the lid for removal of the lid from the bucket 10. In other words, the tear strip 14 and the lid 12 initially are an integral, unitary, one-piece structure. The lid 12 includes a circular shaped, substantially planar cover portion 12a. On the underside of the cover portion 12a are concentric, spaced apart, substantially parallel walls 30a and 30b forming a broken U-shaped channel 30. The wall 30b has an upper edge 30d integral with the perimeter of the cover portion 12a. The walls 30a and 30b form a U-shaped channel 30 and the O-ring 13 is lodged in this U-shaped channel 30, being pressed snugly against the edge 18c at the open mouth 22 when the lid 12 is forced onto this edge 18c. The wall 30b has an undulating lower edge 30c that is integral with a matching, undulating upper edge 14c of the tear strip 14. These edges 30c and 14c are initially attached along a junction 14a where these edges meet. A tear line in the form of a slit (not shown) that partially severs the joined together lid 12 and tear strip 14 along the junction 14a is created during the molding process.

As depicted best in FIG. 1D, opposed ends 14d and 14e of the tear strip 14 are initially attached together and abutting each other. These opposed ends 14d and 14e are initially connected at a junction J comprising a tear line in the form of a slit 13 that partially severs the tear strip at this junction so these ends are easily separated. The tear strip 14 has a slanted inner surface 14g (FIG. 1C) that terminates at a pointed inner edge 14c that engages the underside of the lip 18f at the open mouth 22 when the lid 12 is forced onto the bucket 10 to cover and seal the container 11. As the lid 12 with the attached tear strip 14 is forced onto the edge 18c, the wall 30b flexes outward and the slanted surface 14g of the tear strip 14 moves over this edge 18c until the pointed inner edge 14f is next to the lip 18f. The wall 30b then flexes inward and the pointed inner edge 14c snaps into engagement with the underside of the lip 18f to lock the lid 12 to the bucket 10, pressing the O-ring firmly against the edge 18c. The tear strip 14, being integral with the lid 12, also deforms as required as the lid is placed on the open mouth 22 of the bucket 10. The tear strip is detached from the cover portion 12a in order to remove the lid 12.

To separate the tear strip 14 from the lid 12, the user disconnects the ends 14d and 14e along the junction J and grasps a portion of the tear strip 14, simultaneously pulling the tear strip from the outer wall 30b with the tear strip separating from the lid along the junction 14a. With the tear strip 14 removed, the lid 12 may now be easily lifted off the open mouth 22 of the bucket 10 because the pointed inner edge 14c no longer engages the underside of the lip 18f at the open mouth 22 of the bucket 12. With the lid 12 detached, the O-ring 13 is removed from the open mouth 22. Since the tear strip 14 cannot be reattached, the tear strip, or lack thereof, may be used indicate whether the lid 12 has been previously removed, or that the bucket 10 is being reused.

Figure 3:
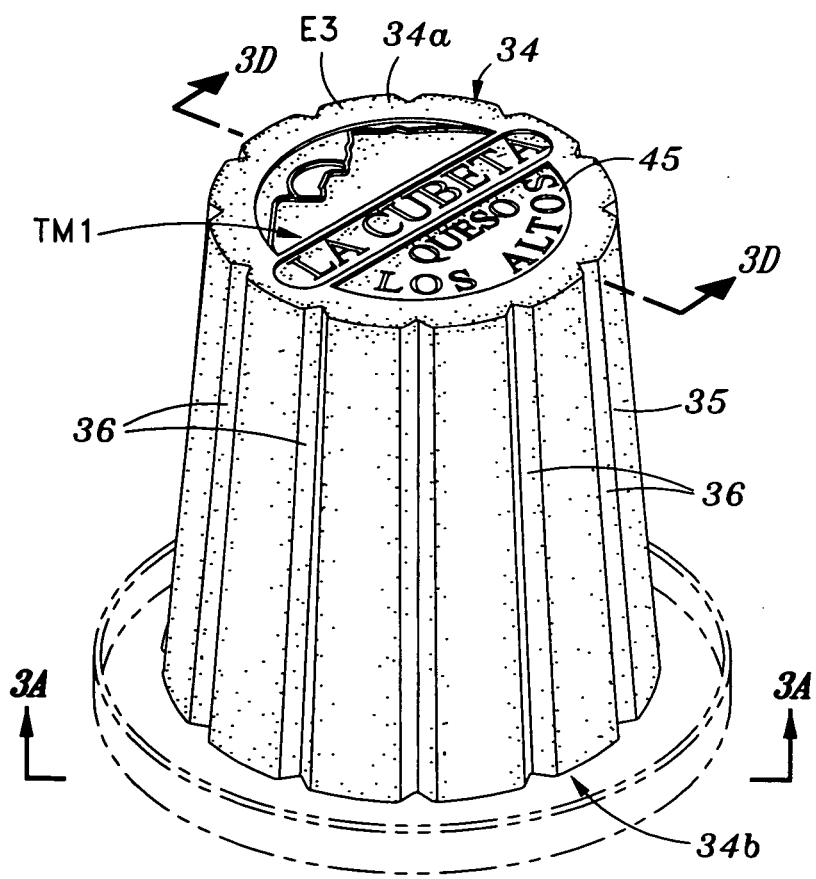
FIG. 3 is perspective view of a block of cheese formed by the process depicted in FIG. 2 using the container shown in FIG. 1.

A branding element in the form of one or more dividers on the inside of the sidewall of a bucket are used to create a brand marking on the side of a cheese block made according to this invention. Typically, an even number of dividers are employed. As shown in FIGS. 1 and 1B, the inner side 18a of the sidewall 18 contains twelve (12), longitudinal, equally spaced apart dividers 24 in the form of V-shaped ribs. In this embodiment, the dividers 24 project inward from the inner side 18a with the apex A of the V pointing towards the longitudinal axis X. The dividers 24 extend lengthwise from at or near the floor 16 to at or near the outer edge 18c of the sidewall 18. These dividers 24 also form a V-shaped groove 18d on the outer side 18e of the sidewall 18. At least some of dividers 24 function as branding elements to form a brand marking in the form of grooves 36 on the cheese block 34 (FIG. 3).

The floor 16 of the bucket 10 includes a branding element 43 in the form of an outlined pattern located on the interior side 16a. As shown in FIGS. 3 and 3D, the branding element 43 impresses on the cheese block's top surface 34a below this top surface 34a the trademark TM1. The trademark TM1 created in the top surface 34a of the cheese block 34 (FIGS. 3 and 3E) is the mirror image of the configuration of the branding element 43. The branding element 43 in this embodiment has lowered regions 43a and raised regions 43b that are formed into the desired pattern that serves as the trademark TM1. Thus, the tops of raised regions R1 of the trademark TM1 are level with the top surface 34c and correspond o the lowered regions 43b of the branding element 43. The bottoms 34d of the lower regions R2 of the trademark TM1 are beneath the surface 34a and correspond to the raised regions 43b of branding element 43. Alternately, as shown in FIGS. 7 and 7A, a branding element (not shown) on the floor of a bucket is configured so that the pattern of the trademark TM2 projects outward from the top surface 34a of a cheese block 70. The trademark TM2 is the mirror image of the branding element on the floor of the container and includes raised regions 77a that are above the top surface 34a of the cheese block 34a and lowered regions 34d that are essentially level with the top surface 34a. The bucket used to form the cheese block 70 does not employ dividers in its sidewall and therefore there are no brand markings on its side.

As discussed above and shown in FIG. 3, the hardened cheese block 34 is removed from the bucket 10 by removing the tear strip 14, detaching the lid 12, and inverting the bucket 10 so the block then slides out the mouth 22 of the bucket with the bottom 34b of the cheese block resting on a flat surface. The cheese block 34 has the same shape as the cavity 26 of the bucket 10. In the one embodiment shown in FIG. 3, it also includes the longitudinal grooves 36 formed by the dividers 24 (FIG. 1) on the exterior surface 35 of the cheese block 34. When the cheese block 34 is displayed, the longitudinal grooves 36 function as a trademark so customers may easily identify the source of the cheese block. In one embodiment, the cheese block 34 weighs from about 20.5 to about 21.5 pounds. Some of these grooves 36 are also used as guides for slicing the cheese block 34 into quarter sections as discussed below.

The cheese block 34 may be divided into smaller portions or cheese slices 38 as depicted in FIG. 5A. As illustrated in FIG. 5, the cheese block 34 may be cut longitudinally along interesting right angle planes 41a and 41b into four approximately equally sized quarter blocks 40 using two sets 36-1 and 36-2 of opposed grooves 36 as cutting guides. While abutting each other after being cut along the interesting planes 41a and 41b, the quarter blocks 40 may then be cut along four, approximately equally spaced apart, parallel latitudinal planes 43a through 43d into five equally thick sections. Alternatively, the cheese block 34 may first be cut along the latitudinal 43a through 43d into five equally thick sections, and then while the five sections are stacked upon each other, the block is then cut longitudinally along the interesting planes 41a and 41b into four quarters using the two sets 36-1 and 36-2 of opposed grooves 36 as cutting guides. In either case, twenty (20) individual, wedge-shaped cheese slices 38 are created. Each slice weighs substantially one pound. Each slice 38 has along an outer brim 38a a pair of parallel segments 36x and 36y of adjacent grooves 36. These segments 36x and 36y of adjacent grooves 36 function as trademarks so customers may easily identify the source of the cheese slice 38. Consequently, the presence of one or more of segments 36x and 36y along the brim 38, regardless of their cross-sectional configuration or shape, serve as a trademark.

Figure 8:
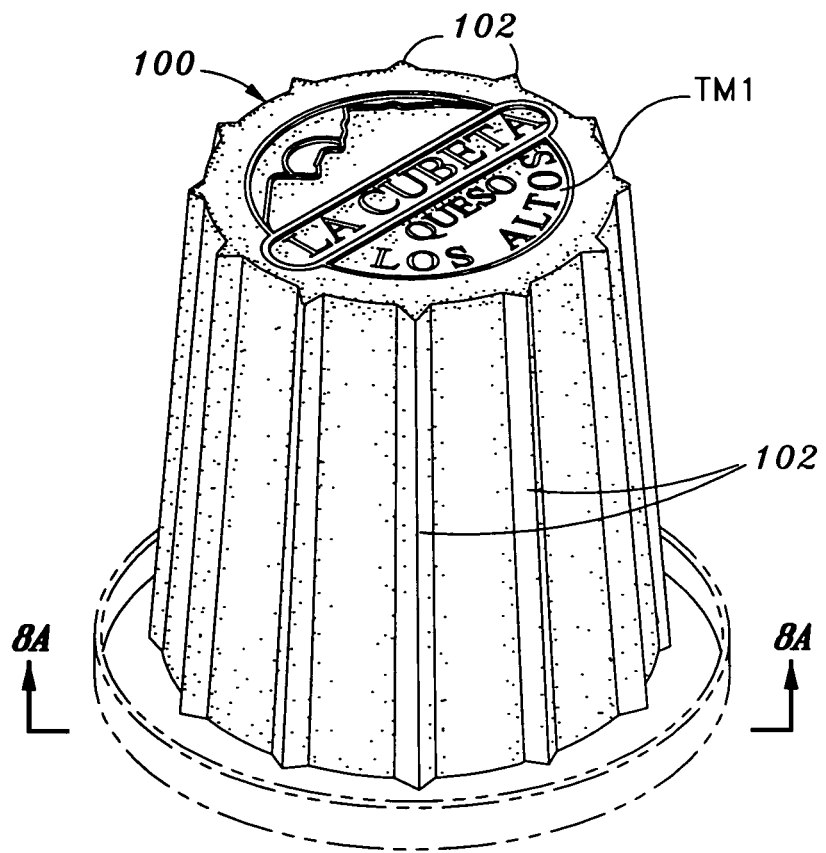
FIG. 8 is a perspective view of a block of cheese according to another embodiment of this invention having twelve (12) substantially V-shaped, outwardly projecting, longitudinal ribs along the side of the cheese block.

In accordance with this invention, a cheese block may include one or more of the different types of brand markings formed concurrently with the manufacture of the cheese block. Namely, there may be (1) one or more brand markings along the cheese block's side and on its top surface (FIGS. 1 and 8), or (2) one or more brand markings only along the block's side (FIGS. 5 and 6), or (3) only have a brand marking on the block's top surface (FIG. 7). The brand markings along the cheese block's side may have different configurations, for example in addition to being V-shaped, some or all of the grooves may have a U-shape (FIG. 8C) or a semicircular shape (FIG. 8B). Moreover, the brand markings along the cheese block's side may not be grooves but take other forms such as, for example, one or more projections that extend outward from the side of the cheese block such as shown in FIGS. 8 through 8D. The number of the brand markings in the side of a cheese block may also vary. It is not required that the brand markings in the side of a cheese block be equally spaced apart or that the number of brand marking be an even number. For example, an arrangement of an odd number of brand markings may be used so that when the cheese block is cut into slices some cheese slices will have two brand markings while others only have a single brand marking.

Figures 3A, 3B:
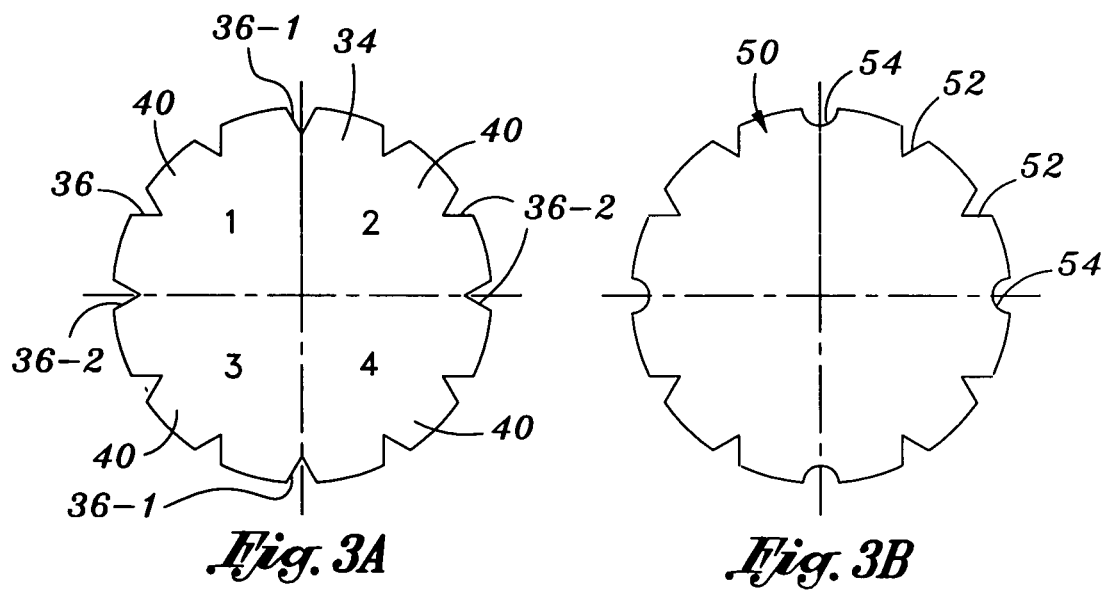
FIG. 3A is a bottom view of the cheese block taken along line 3A-3A in FIG. 3 showing twelve (12) longitudinal grooves in the side of the cheese block, all the grooves having a substantially V-shape.
FIG. 3B is a bottom view of another embodiment of the cheese block of this invention showing twelve (12) longitudinal grooves in the side of the cheese block, eight (8) grooves having a substantially V-shape and four (4) grooves having a substantially semi-circular shape.
Figure 3C:
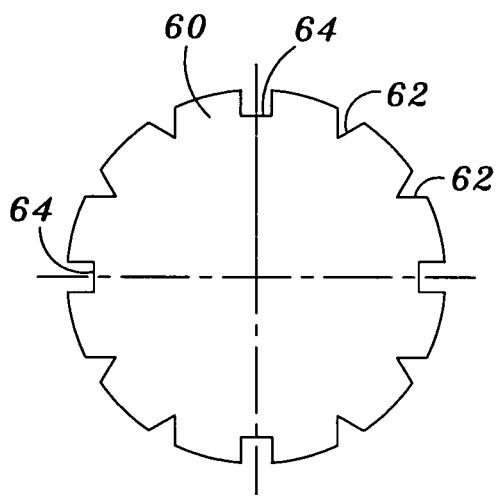
FIG. 3C is a bottom view of another embodiment of the cheese block of this invention showing twelve (12) longitudinal grooves in the side of the cheese block, eight (8) grooves having a substantially V-shape and four (4) grooves having a substantially U-shape.
Figure 3D:
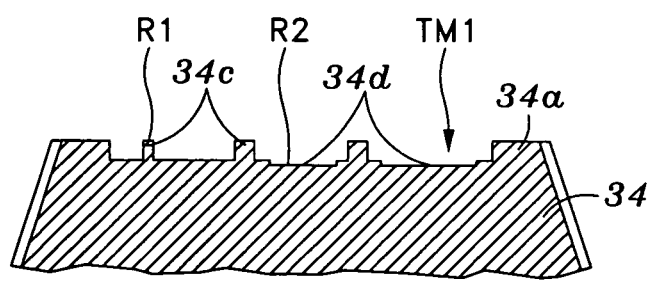
FIG. 3D is cross-sectional view taken along line 3D-3D of FIG. 3.

In the one embodiment shown in FIG. 3B, a cheese block 50 has eight (8), V-shaped grooves 52 as well as four (4), semi-circular shaped grooves 54. The semi-circular grooves 54 may be used as cutting guides, while the V-shaped grooves 52 function as brand markings. Alternatively, some of the V-shaped grooves 52 may be used as cutting guides, while a combination of V-shaped grooves 52 and semi-circular grooves 54 are used as brand markings. In the one embodiment shown FIG. 3C, a cheese block 60 has eight V-shaped grooves 62 used as brand markings, as well as four U-shaped grooves 64 used as cutting guides. Alternatively, some of the V-shaped grooves 62 may be used as cutting guides, while a combination of V-shaped grooves 62 and U-shaped grooves 64 are used as brand markings. In the one embodiment shown FIGS. 6 and 6B, a cheese block 80 has eight, V-shaped grooves, with the pairs of grooves identified by the numerals 72-1 and 72-2 being used as cutting guides 74 and the grooves being identified by the numeral 76 serving as brand markings. In the cheese block 80 only eight (8), spaced-apart V-shaped, longitudinal grooves 76 are employed. They may be arranged to provide only one segment of a groove 76 in the brim 88a of a cheese slice 88 cut from the block 80.

Figure 8A:
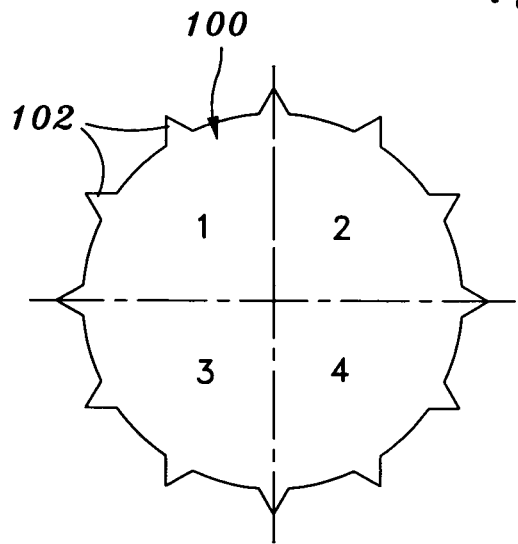
FIG. 8A is bottom view taken along line 8A-8A of FIG. 8.
Figure 8B:
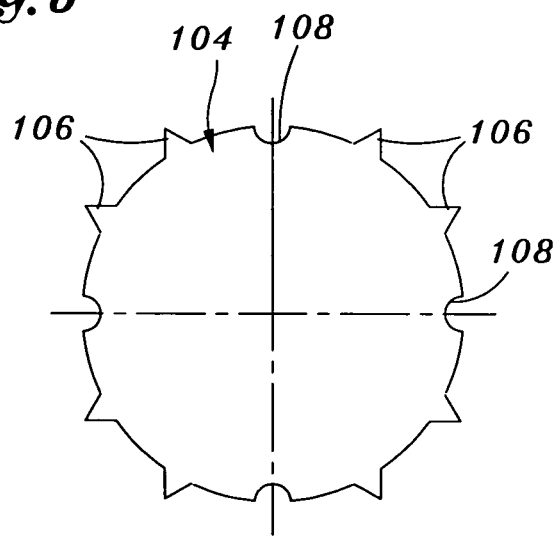
FIG. 8B is a bottom view of another embodiment of the cheese block of this invention showing eight (8) substantially V-shaped, outwardly projecting, longitudinal ribs along the side of the cheese block and four (4) substantially semi-circular shape, longitudinal grooves in the side of the cheese block.
Figure 8C:
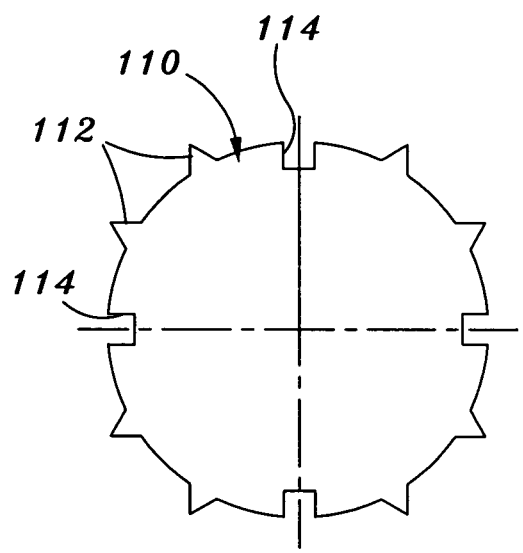
FIG. 8C is a bottom view of another embodiment of the cheese block of this invention showing eight (8) substantially V-shaped, outwardly projecting, longitudinal ribs in the side of the cheese block and four (4) substantially U-shaped, longitudinal grooves in the side of the cheese block.
Figure 8D:
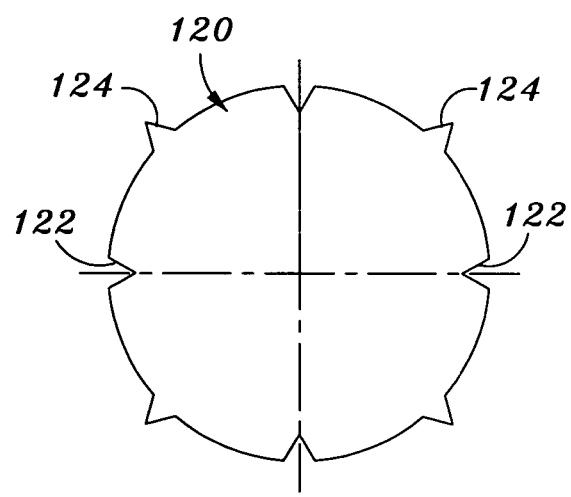
FIG. 8D is a bottom view of another embodiment of the cheese block of this invention showing four (4) substantially V-shaped, outwardly projecting, longitudinal ribs in the side of the cheese block and four (4) substantially V-shaped, longitudinal grooves in the side of the cheese block.
Figure 9:
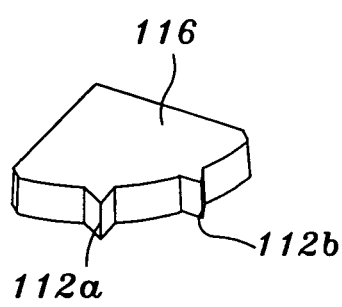
FIG. 9 is a perspective view of a slice of cheese taken from the block of cheese shown in FIG. 8B.
Figure 10:
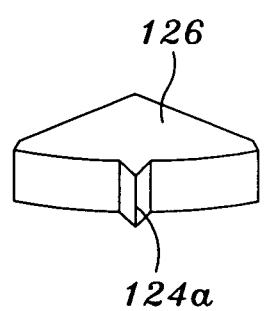
FIG. 10 is a perspective view of a slice of cheese from the block of cheese shown in FIG. 8D.

FIGS. 8 and 8A illustrate one embodiment where a cheese block 100 is formed having twelve V-shaped, outwardly projecting ribs 102. The outwardly projecting ribs 102 may be created from a bucket having outwardly projecting V-shaped portions (not shown) with open entryways in the sidewall of a bucket. As discussed above, the ribs 102 may be used as guides to cut the block of cheese 100 into four, equally-sized quarter blocks, as well as brand markings. FIG. 8B illustrates one embodiment of a cheese block 104 having eight (8) outwardly-projecting ribs 106 and four (4) semi-circular grooves 108. The semi-circular grooves 108 may be used as guides to cut the block 104 into four, equal-sized quarter blocks, while the ribs 106 are used as brand markings. Alternatively, a pair of opposed ribs 106 may be used as cutting guides, and a combination (not shown) of one rib 106 and one semi-circular grooves 108 may be used as brand markings. FIG. 8C illustrates one embodiment where a cheese block 110 is formed having eight (8), V-shaped ribs 112, and four (4) U-shaped grooves 114. The U-shaped grooves 114 may be used as guides to cut the block 110 into four, equal-sized quarter blocks. FIG. 9 illustrates a cheese slice 116 produced from the block 110 in FIG. 8C where two substantially parallel ribs 112a and 112b are used as brand markings. Alternatively, opposed V-shaped ribs 112 may be used as cutting guides, and a combination (not shown) of U-shaped grooves 114 and V-shaped ribs are used as brand markings. FIG. 8D illustrates one embodiment where a cheese block 120 is formed having four (4) V-shaped grooves 122, and four (4) V-shaped ribs 124. The grooves 122 are used as guides to cut the block 120 into four, equal-sized quarter blocks, while the ribs 124 are used as brand markings. FIG. 10 illustrates a cheese slice 126 produced from the block 120 where a portion 126a of a rib functions as a brand marking. Alternatively, the ribs 124 may be used as cutting guides while the grooves 122 function as brand markings.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

The invention claimed is:

1. A method of displaying cheese comprising
    (a) removing a cheese block formed in a container having a plurality of spaced apart longitudinal divider members along a sidewall of the container that provide a plurality of longitudinal grooves on an external surface of the cheese block upon removal of said block from the container,
    (b) latitudinally and longitudinally cutting the cheese block into slices, using some of the longitudinal grooves as guides to sever the block longitudinally, and cutting some of the longitudinal grooves latitudinally into groove segments, individual groove segments being on brims of individual slices, said individual groove segments serving as a trademark, and
    (c) displaying the slices with a trademark groove segment on the brim for view by customers.

2. The method recited in claim 1 where the container has a volume of substantially 2.2 gallons.

3. The method recited in claim 1 where the cheese block has a truncated conical shape and the block is cut into wedge shaped slices by
    (i) first severing the block longitudinally into four quarters using as guides two pairs of the longitudinal grooves serving as guides that are opposed, and
    (ii) then severing the quarters while said quarters are positioned adjacent each other along substantially equally spaced apart, substantially parallel latitudinal planes to cut the quarters into five substantially equally thick sections to form individual slices, each said individual slice having an outer brim including a segment of at least one longitudinal grooves serving as a trademark.

4. The method recited in claim 1 where the container has a floor with a branding element thereon that forms a second brand marking on a surface of the cheese block, said container being inverted to remove said block and display the second brand grooves upon resting the block on a side that is opposite said surface of the cheese block.

5. The method recited in claim 1 where the cheese block weighs substantially from 20.5 to 21.5 pounds and has a truncated conical shape and is cut up into twenty wedged shaped slices, severing along four equally spaced apart longitudinal grooves serving as guides and severing along substantially equally spaced apart, substantially parallel latitudinal planes to cut into five substantially equally thick sections.

* * * * *